Nov. 25, 1958 H. TÖPFER 2,862,057

CALL METERING IN TELEPHONE SYSTEMS AND THE LIKE

Filed April 21, 1955 2 Sheets-Sheet 1

INVENTOR.
Herbert Töpfer
BY [signature]
Atty.

CALL METERING IN TELEPHONE SYSTEMS AND THE LIKE

Filed April 21, 1955 2 Sheets-Sheet 2

INVENTOR.
Herbert Töpfer
BY
Att'y.

United States Patent Office 2,862,057

Patented Nov. 25, 1958

2,862,057

CALL METERING IN TELEPHONE SYSTEMS AND THE LIKE

Herbert Töpfer, Munich, Germany, assignor to Siemens & Halske Aktiengesellschaft, Munich, Germany, a corporation of Germany Application April 21, 1955, Serial No. 502,909
In Germany October 1, 1948

Public Law 619, August 23, 1954

Patent expires October 1, 1968

12 Claims. (Cl. 179—7.1)

Figure 1:
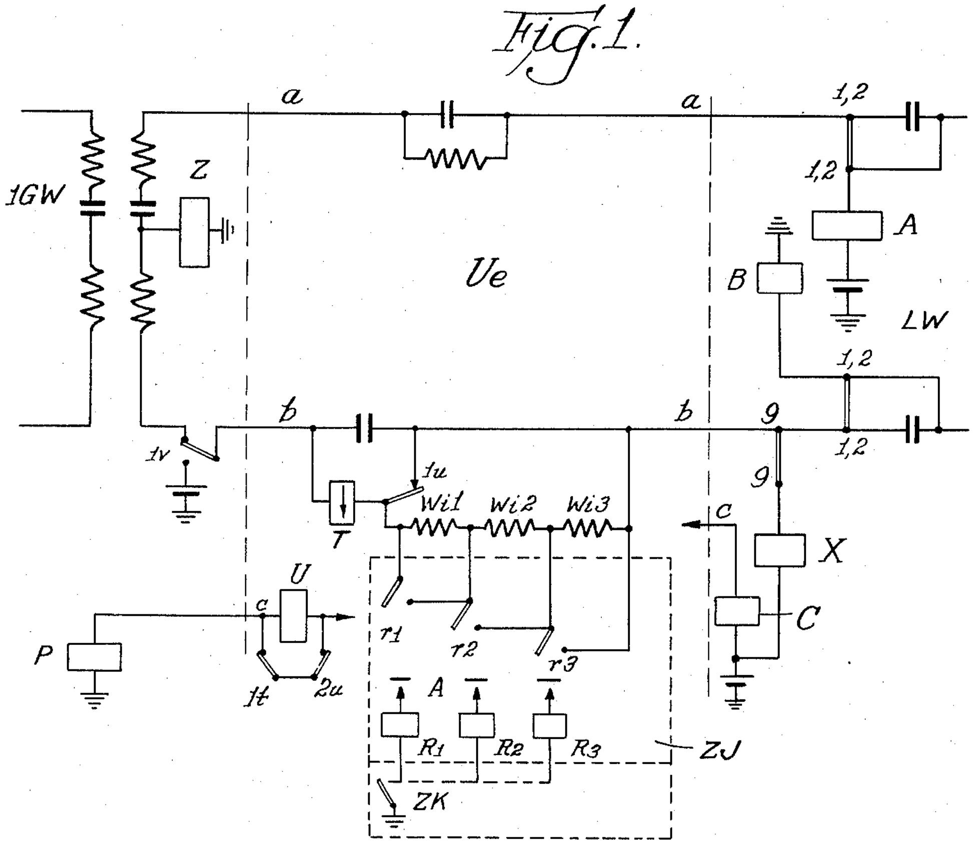

This invention is concerned with call metering in telecommunication systems and especially in telephone systems.

The metering of calls in telecommunication systems, in particular telephone systems, can be carried out either while a call is in progress or after completion thereof. The metering after completion of a call poses strict requirements with respect to the energization and the release of the relays involved in the metering because, in the interest of a prompt clearing of the involved switching devices, the metering pulses must be given through as rapidly as possible. When the metering is effected while a call is in progress, there is sufficient time available for the transmission of the metering pulses, but such pulses must not disturb the parties participating in the call. The requirement that the transmission of the metering pulses must be such as to avoid any noises in an existing connection is important particularly in zone traffic, where it is usually necessary to transmit over the line or speech conductors a relatively large number of pulses with pulse intervals varying according to the zone or zones involved. Aside from the requirement that periodical acoustic disturbances on a line by the metering pulses must be avoided, care must also be taken that the actuation of the relays supervising the metering operations does not cause weakening of the speech currents. Moreover, the establishment of the corresponding connection, especially the dialling, must not be impaired by the supervising relays connected to the line conductors.

The invention provides a particularly economical and technically simple solution for the problems, posed by the above indicated situation, by inserting in the line conductors over which the metering is effected, responsive to a call start criterion or signal, a polarized supervising relay, such relay being connected in an operating circuit extending over a line conductor by reversal of the potential and thereby causing connection to the line conductor of a pulse transmitter generating the metering pulses.

Figure 2:
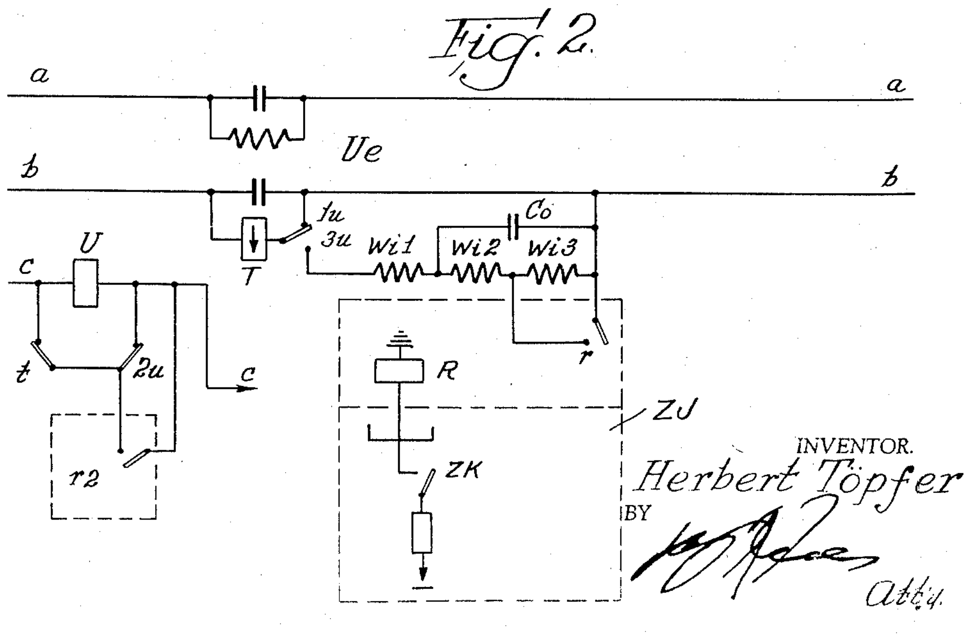
Figure 2A:
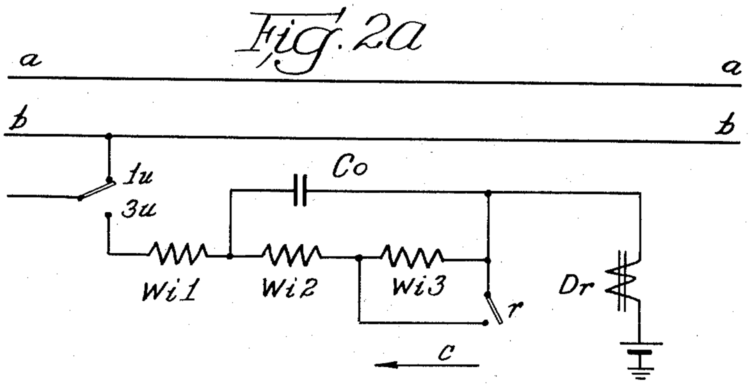
Figure 3:
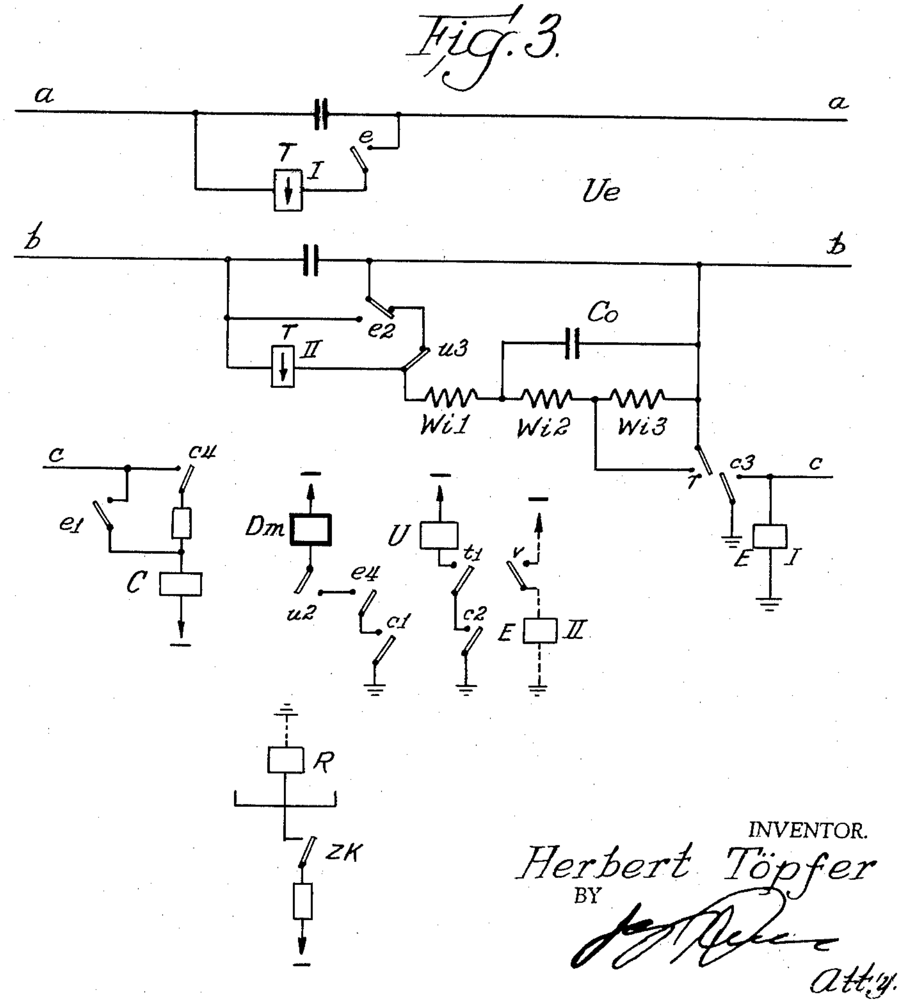

The above noted and additional objects and features of the invention will be brought out in the course of the description which will presently be rendered with reference to the accompanying drawings showing the invention by way of example incorporated in a system utilizing ground impulses for setting switches to extend calls, including a connector comprising a control switch for governing various switching functions. In the drawings, Fig. 1 shows in simplified diagrammatic manner an embodiment of the invention in which the metering pulses are transmitted by timed stepwise shunting of resistors;

Fig. 2 illustrates how metering impulses may be transmitted in the circuit according to Fig. 1 in timed sequence so as to obtain interference-free rise and decay of the metering potential and to guard against suppression of metering by wrongful manipulation of the dial at the calling station;

Fig. 2*a* shows in fractional view a modified circuit for connecting resistors also shown in Fig. 2; and Fig. 3 indicates the use of a metering supervisory or control relay for the twofold purpose of receiving code or zone digits during the building up of a call and for controlling the metering after the call has been completed.

The drawings show for the sake of simplicity only the circuit details required for the understanding of the invention.

An example of a system utilizing ground impulses for the setting of switches and including a connector comprising a control switch, as mentioned before, is described in Patent No. 1,796,209, issued to M. Mathias on March 10, 1931.

Referring now to Fig. 1, there is assumed a connection extending over a preceding first group selector IGW and a connector LW. The connector is provided with a control switch of the rotary type having wipers which are automatically stepped to establish or control circuits required for the building up of calls. The illustrated elements of the switches are shown in the drawings in the state as it exists upon completion of the dialling by a calling party, that is, the connection has been extended by way of the first group selector IGW has to the connector LW (Fig. 1) and the latter has extended the call to the desired called subscriber line or station in known manner. A and B designate the line relays of the connector over which battery is fed to the called subscriber line. The rotary control switch associated with the connector LW (the stepping magnet of which is shown in Fig. 3 at D*m*) is actuated during the receipt of impulses transmitted from the calling station to step its wipers so as to interconnect terminal contacts 1 and 2 (top right end of Fig. 1). Relay A serves as a pulse receiving relay; it receives ground pulses over the line conductor *a* which are connected thereto by a contact of the impulsing line relay of the group selector; and relay B serves as a control relay and is thereafter energized over the line conductor *b*. When the called subscriber answers by lifting his receiver, the control switch in the connector LW (Fig. 1) is actuated to step its wipers so as to interconnect terminal contacts 9. In this position, a potential is connected to the line conductor *b*, by way of choke coil X, as a criterion for the metering. A circuit is closed for the energization of polarized relay T and relay Z in the group selector IGW, such circuit extending from —, choke X, control switch position 9, line conductor *b*, contact 1*u*, relay T, contact 1*v*, relay Z to +. Relays T and Z energize. Relay T may be either a mechanically polarized or an electrically polarized relay, that is, a direct current relay in circuit with a rectifier. Relay T in the repeater U*e* opens its contact 1*t*, thereby causing energization of relay U which is disposed in the incoming private conductor *c*. Relay U opens its contact 2*u* to maintain itself operated independent of contact 1*t*. By opening its contact 1*u*, relay U connects relay T in a high resistance holding circuit comprising the resistors Wi1, Wi2, Wi3. Relay T remains energized while relay Z in the first group selector IGW is caused to release, thus terminating the first metering pulse.

Upon seizure of the repeater U*e* by the preceding first group selector, which is effected in known manner over wipers of the group selector, the common metering pulse transmitter ZJ is set in operation. Over a timing contact *zk*, which may be periodically actuated, for example, to close every 20 seconds, the relays R1, R2, R3 of a relay chain A are successively respectively connected and disconnected, thereby correspondingly actuating the contacts *r*1, *r*2, *r*3 and successively short-circuiting the resistors W*i*1, W*i*2, W*i*3. The current is thereby increased in steps in the line conductor *b* and the metering relay Z is caused to energize and transmits in suitable manner the corresponding metering pulses. A metering pulse is thus transmitted every 20 seconds for the duration of the call. When the calling subscriber replaces his receiver at the conclusion of the call, the first group selector IGW is in known manner released, thereby disconnecting the repeater U*e* and the connector LW and thus causing release thereof.

Fig. 2 shows features incorporated in the above described circuit so as to obtain interference-free rise and decay of the metering potential on the line conductor at the beginning and end of each metering pulse. As shown, the resistance variation and hence the current variation in the metering circuit is not effected in steps but occurs continuously and requires no relay chain but a single relay and a capacitor, which may be relatively small. This capacitor, marked C*o*, is disposed in Fig. 2 parallel to the resistors W*i*2 and W*i*3. With each pulse, the resistor W*i*3 is momentarily shunted by contact *r* of the relay R of the pulse transmitter ZJ. Relay R, in turn, is connected every 20 seconds by the timing contact *zk*. At the beginning of a metering pulse, during which the resistor W*i*3 is shunted by contact *r*, the increase of the metering current takes place gradually rather than suddenly, because the capacitor C*o* disposed parallel to the resistors W*i*2 and W*i*3 was charged before the pulse to a voltage corresponding to the voltage decrease at the resistors W*i*2 and W*i*3, which voltage counteracts the sudden voltage increase at resistor W*i*2 at the moment of the short-circuiting of resistor W*i*3. The voltage or current increase is thus a continuous one until the voltage difference between resistor W*i*2 and capacitor C*o* is balanced. The reverse takes place upon opening of the short-circuit around resistor W*i*3 at the end of a metering pulse.

The circuit according to Fig. 2 further assures the metering in case a calling subscriber tries to suppress metering by redialling. As the dial is being operated, a delay relay (not shown) in the first group selector energizes in known manner, placing a control voltage on the line conductor *b* by actuating contact 1*v* (Fig. 1) and disconnecting the metering relay Z from this conductor. The result is that the metering relay T is caused to deenergize. In order to assure release of the auxiliary relay U connected to the incoming private conductor *c*, which would maintain itself because of the opening of its contact 2*u*, and thereby also to interrupt the metering circuit at contact 3*u*, relay U is short-circuited during a metering pulse over contact *r*2. Upon completion of the irregular dialling of the subscriber, the line conductor *b* is again grounded over the metering relay Z after the control relay in the first group selector has deenergized and closed its contact 1*v*. The polarized supervising relay T is accordingly again energized in series with the metering pulse transmitting relay Z in the first group selector. Relay T opens contact *t* to cause the auxiliary relay U to energize and the latter again connects the resistors in the metering circuit, whereupon the metering relay Z is again caused to deenergize. The metering pulse which was to be suppressed by the redialling of the subscriber is in this manner made effective.

According to another object and feature of the invention, the polarized metering supervising relay T may be advantageously used for a twofold purpose by providing it with two windings, one of which, disposed in one line conductor, serves to receive the code pulse series in zone traffic, while the other, disposed in the other line conductor, initiates the metering upon completing the extension of a call. Fig. 3 shows the corresponding repeater circuit. The operation is as follows:

In the normal state of the repeater U*e*, relay E is energized in a circuit extending over its winding I and the outgoing private conductor *c*. Relay C energizes over closed contact *e*1 and the incoming private conductor *c*, upon seizure of the repeater by the first group selector, applying ground at its contact *c*3 and thereby busying the outgoing private conductor *c* and simultaneously short-circuiting winding I of relay E. Relay E, however, is maintained during the transmission of dial pulses in a circuit extending over its winding II and contact *v* of a known control relay (not shown). At its contact *c*1, relay C prepares a circuit for the rotary magnet D*m* of the control switch associated with the conductor which receives the pulses corresponding to a code digit, and at contact *c*2, a circuit is prepared for relay U. During the actuation of relay E, the winding I of the polarized metering supervising relay T is connected in the line conductor *a* over contact *e*, while winding II of relay T is disconnected from the line conductor *b* at contact *e*2. The incoming pulses produced by the dial operation at the calling station, which are transmitted by grounding the line conductor *a*, as previously indicated are received by winding I of relay T and such relay is correspondingly actuated. At contact *t*1, relay T closes a circuit for the operation of relay U. Relay U transmits the pulses to the rotary magnet D*m* by means of contact *u*2. Upon conclusion of the transmission of the pulses, the relay which controls contact *v* deenergizes, thus opening such contact to cause relay E to deenergize. The winding I of relay T is disconnected from the line conductor *a* at contact *e* and winding II of relay T is connected to the line conductor *b* over the contacts *e*2 and *u*3. When current is connected to the line conductor *b* in the connector upon answering of the called party, over the control switch position 9, as has been described with reference to Figs. 1 and 2, relay T will be energized over its winding II. Relay T closes at its contact *t*1 a circuit for the auxiliary relay U and the latter opens its contact *u*3, thereby connecting the resistors W*i*1, W*i*2, W*i*3 in the metering circuit. Parallel to the resistors W*i*2 and W*i*3 there is disposed the capacitor C*o*, by means of which, in the same manner as in the circuit according to Fig. 2, the metering pulses are transmitted by relay R without interference during short-circuiting of resistor W*i*3.

The impulse generator ZJ is common to a plurality of connecting devices as is indicated in Figs. 2 and 3 by the multiple connections branching from relay R.

In the case of long lines, where the metering current might become too weak for periodic metering due to the high resistance involved, it is advantageous to dispose the resistors in a circuit as indicated in Fig. 2*a*. According to this circuit, the resistors W*i*1, W*i*2, W*i*3 required for periodic metering are connected to a local current source over a choke D*r*. In this way, the line resistance of the line sections in back of the transmission of the metering pulses and the resistance of the choke X in the connector LW is removed for periodic metering, so that the use of the new metering arrangement does not restrict the required range.

Changes may be made within the scope and spirit of the appended claims.

I claim:

1. Circuit arrangement for metering telephone calls while connections between calling and called subscribers are in progress over line conductors extending between switches involved in such calls, said circuit arrangement comprising a polarized supervising relay having a winding disposed in one of said line conductors, circuit means for actuating said polarized supervising relay by current flowing over the called subscriber's loop responsive to answering of the called subscriber, a high resistance meter impulse control circuit, means governed by said polarized supervising relay upon actuation thereof for connecting said high resistance meter impulse control circuit to one of said line conductors, and a metering impulse transmitting device for periodically altering the resistance of said meter impulse control circuit to transmit impulses over said one line conductor to meter the corresponding call.

2. A circuit arrangement according to claim 1, comprising a plurality of interconnected resistors constituting said high resistance meter impulse control circuit.

3. A circuit arrangement according to claim 1, comprising a relay chain in said transmitting device, and contact means controlled by said relay chain for altering the resistance of said meter impulse control circuit.

4. A circuit arrangement according to claim 1, comprising a plurality of interconnected resistors constituting said high resistance meter impulse control circuit, a relay chain in said transmitting device, and contact means controlled by said relay chain cooperating with said resistors for altering the total resistance formed thereby.

5. A circuit arrangement according to claim 1, comprising a plurality of interconnected resistors constituting said high resistance meter impulse control circuit, said metering impulse transmitting device comprising a single periodically actuated relay, capacitor means connected with said interconnected resistors, and contact means actuated by said relay and controlling said interconnected resistors and said capacitor means for altering the total resistance formed thereby.

6. A circuit arrangement according to claim 1, comprising means for connecting said metering impulse transmitting device in a multiple in common to a plurality of connections established between calling and called subscribers.

7. A circuit arrangement according to claim 1, comprising a switching relay controlled by said polarized supervising relay for connecting said high resistance meter impulse control circuit to one of said line conductors.

8. A circuit arrangement according to claim 1, comprising a switching relay controlled by said polarized supervising relay for connecting said high resistance meter impulse control circuit in series with said polarized supervising relay.

9. A circuit arrangement according to claim 1, comprising circuit means for effecting transmission of a metering impulse in the presence of temporary interruption of the metering responsive to irregular superfluous dialing by the calling subscriber.

10. A circuit arrangement according to claim 1, comprising circuit means for effecting transmission of a metering impulse in the presence of temporary interruption of the metering responsive to irregular superfluous dialing by the calling subscriber, said polarized supervising relay being caused to release responsive to said irregular dialing, a relay in said meter impulse transmitting device, and means controlled by said last named relay for causing transmission of a metering impulse responsive to cessation of said irregular dialing.

11. A circuit arrangement according to claim 1, wherein said polarized supervising relay comprises two windings, a switching relay controlled by said polarized supervising relay for connecting said high resistance meter impulse control circuit to one of said line conductors, one of said windings of said polarized supervising relay being disposed in one line conductor and being operative to actuate said switching relay in response to dial pulses transmitted over said line conductor, the other of said windings of said polarized relay being disposed in the other line conductor to control the transmission of metering impulses.

12. A circuit arrangement according to claim 1, comprising a metering relay disposed ahead of said arrangement in the call originating exchange, circuit means for connecting said metering relay to said line conductors for initial operation thereof upon completion of a call to register the first metering unit, subsequent operation of said metering relay being controlled from said arrangement by the alteration of said high resistance meter impulse control circuit.

References Cited in the file of this patent

UNITED STATES PATENTS

| | | |
|---|---|---|
| 2,543,022 | Horwitz | Feb. 27, 1951 |
| 2,597,869 | Horwitz | May 27, 1952 |